US012772189B2

(12) United States Patent
Otanez et al.

(10) Patent No.: US 12,772,189 B2
(45) Date of Patent: Oct. 20, 2026

(54) REAL-TIME GPS MEASUREMENT LAG COMPENSATION FOR VEHICLE STATE ESTIMATES

(71) Applicant: GM GLOBAL TECHNOLOGY OPERATIONS LLC, Detroit, MI (US)

(72) Inventors: Paul Guillermo Otanez, Franklin, MI (US); Travis Whitley, Archer, FL (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 292 days.

(21) Appl. No.: 18/395,800

(22) Filed: Dec. 26, 2023

(65) Prior Publication Data

US 2025/0212148 A1 Jun. 26, 2025

(51) Int. Cl.
*H04W 56/00* (2009.01)

(52) U.S. Cl.
CPC ... *H04W 56/0065* (2013.01); *H04W 56/0025* (2013.01)

(58) Field of Classification Search
CPC ......... H04W 56/0065; H04W 56/0025; B60W 40/105; B60W 40/107; B60W 2556/50; B60W 50/04; G01C 21/165; G01S 19/396; G01S 19/14; G01S 19/52
See application file for complete search history.

(56) References Cited

U.S. PATENT DOCUMENTS

| | | | | |
|---|---|---|---|---|
| 9,671,500 B1 * | 6/2017 | Hay | G01S 19/07 |
| 2013/0116908 A1 * | 5/2013 | Oh | G05D 1/0295 701/96 |
| 2022/0086786 A1 * | 3/2022 | Narasimha | H04B 7/18506 |
| 2022/0196852 A1 * | 6/2022 | Reimer | G01S 19/49 |

FOREIGN PATENT DOCUMENTS

| | | | |
|---|---|---|---|
| DE | 102012201811 A1 | 5/2013 |
| DE | 102016118928 A1 | 4/2017 |
| KR | 20220147865 A | 11/2022 |

OTHER PUBLICATIONS

Ding et al., "Longitudinal Vehicle Speed Estimation for Four-Wheel-Independently-Actuated Electric Vehicles Based on Multi-Sensor Fusion", 2020, IEEE (Year: 2020).*

Min et al., "Kinematic and Dynamic Vehicle Model-Assisted Global Positioning Method for Autonomous Vehicles with Low-Cost GPS/Camera/In-Vehicle Sensors", 2019, Sensors (Year: 2019).*

Jo et al., "Distributed Vehicle State Estimation System Using Information Fusion of GPS and In-vehicle Sensors for Vehicle Localization", 2011, IEEE (Year: 2011).*

German Office Action from counterpart DE1020241043636, dated Dec. 11, 2024.

* cited by examiner

*Primary Examiner* — Justin T Van Roie

(57) ABSTRACT

A control system for a vehicle includes: at least one parameter module configured to receive at least one sensor signal from at least one sensor and generate at least one parameter signal; a measurement comparison module configured to receive a measurement signal from a global position system receiver and the at least one parameter signal, and based on the measurement signal and the at least one parameter signal, determine delay in the measurement signal and generate a delay signal indicative of the delay; and at least one parameter consuming and control module configured to controlling at least one operation of the vehicle based on the delay.

19 Claims, 8 Drawing Sheets

REAL-TIME GPS MEASUREMENT LAG COMPENSATION FOR VEHICLE STATE ESTIMATES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to delay associated with signals received by global positioning system (GPS) receivers.

A host vehicle can include a GPS receiver that is configured to receive parameter signals indicating state of the host vehicle. For example, the GPS receiver can indicate a location of the host vehicle and an estimated speed of the host vehicle. The host vehicle can also include various sensors for detecting the same parameters and other parameters related to the parameters indicated by the parameter signals. For example, the host vehicle can also include wheel speed sensors, inertial measurement sensors, accelerometers, etc. based on which a speed of the vehicle can be determined.

SUMMARY

A control system for a vehicle is disclosed and includes: at least one parameter module configured to receive at least one sensor signal from at least one sensor and generate at least one parameter signal; a measurement comparison module configured to receive a measurement signal from a global position system receiver and the at least one parameter signal, and based on the measurement signal and the at least one parameter signal, determine delay in the measurement signal and generate a delay signal indicative of the delay; and at least one parameter consuming and control module configured to controlling at least one operation of the vehicle based on the delay.

In other features, the at least one parameter consuming and control module include: a vehicle state estimation module configured to estimate a parameter of the vehicle based on the measurement signal, the at least one parameter signal, and the delay signal; and an actuator control module configured to control at least one actuator based on the estimate of the parameter.

In other features, the at least one parameter consuming and control module performs at least one of a diagnostic operation and a safety operation based on the delay.

In other features, the measurement comparison module is configured to receive a first uncertainty signal indicative of an uncertainty level of the measurement signal, and to generate a second uncertainty signal indicative of an uncertainty level of the delay indicated by the delay signal. The at least one parameter consuming and control module is configured to estimate the parameter based on the second uncertainty signal.

In other features, the at least one parameter consuming and control module is configured to generate a third uncertainty signal based on the second uncertainty signal, and to estimate the parameter based on the third uncertainty signal.

In other features, the measurement comparison module is configured to compare the measurement signal to the at least one parameter signal to generate the delay signal based on a timing difference between the measurement signal and the at least one parameter signal.

In other features, the delay of the measurement signal relative to the at least one parameter signal varies over time.

In other features, the measurement comparison module is configured to time shift the measurement signal based on the delay. The at least one parameter consuming and control module is configured to is configured to estimate the parameter based on the time shifted measurement signal.

In other features, the at least one parameter consuming and control module is configured to receive the measurement signal with a timestamp, and estimate the parameter based on the timestamp and the delay.

In other features, the at least one parameter consuming and control module is configured to receive the measurement signal with a timestamp, time shift the measurement signal, and estimate the parameter based on the time shifted measurement signal.

In other features, the measurement comparison module includes: a kinematic velocity estimation module configured to generate an estimated velocity signal indicative of an estimated velocity of the vehicle; and a delay determination module configured to determine the delay based on the estimated velocity signal.

In other features, the at least one parameter signal includes a wheel speed signal and a steering angle signal. The kinematic velocity estimation module is configured to generate the estimated velocity signal based on the wheel speed signal and the steering angle signal.

In other features, the kinematic velocity estimation module is configured to generate an enable signal based on at least one of the wheel speed signal and the steering angle signal. The delay determination module is configured to determine the delay based on the enable signal.

In other features, a method for controlling operation of a vehicle is disclosed. The method includes: receiving at least one sensor signal from at least one sensor and generating at least one parameter signal; receiving a measurement signal from a global position system receiver and the at least one parameter signal, and based on the measurement signal and the at least one parameter signal, determining delay in the measurement signal and generating a delay signal indicative of the delay; and controlling at least one operation of the vehicle based on the delay.

In other features, the method further includes: receiving a first uncertainty signal indicative of an uncertainty level of the measurement signal, and to generate a second uncertainty signal indicative of an uncertainty level of the delay indicated by the delay signal; generating a third uncertainty signal based on the second uncertainty signal, and estimating the parameter based on the second uncertainty signal and the third uncertainty signal.

In other features, the method further includes comparing the measurement signal to the at least one parameter signal to generate the delay signal based on a timing difference between the measurement signal and the at least one parameter signal.

In other features, the method further includes: time shifting the measurement signal based on the delay; and estimating the parameter based on the time shifted measurement signal.

In other features, the method further includes: receiving the measurement signal with a timestamp; and estimating the parameter based on the timestamp and the delay.

In other features, the method further includes: receiving the measurement signal with a timestamp, time shift the measurement signal; and estimating the parameter based on the time shifted measurement signal.

In other features, the method further includes: generating a velocity signal indicative of an estimate of a velocity of the vehicle; and determining the delay based on the velocity signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

In addition, current GPS speed information received at a vehicle can have long and variable delay (e.g., longer than 25 ms) creating uncertainty in measurements made using a GPS receiver, such as longitudinal velocity measurements. GPS measurements provide an independent source of parameters (e.g., vehicle speed and location). GPS is especially useful in low traction conditions in which other vehicle sensors such as wheel speeds and accelerometers can produce unreliable and noisy measurements. GPS measurements however exhibit delays due to sensor delays, communication delays, and loop execution rates. Thus, there are measurement confidence inaccuracies associated with GPS measurements. The GPS measurements can violate measurement assumed probability distributions. Traditional systems are not able to determine GPS health and performance in real-time. The stated lag can also result in inaccurate and lagged later vehicle speed and/or location estimates and inaccurate and lagged vehicle slip angle estimates. Traditional systems also do not have effective diagnostics of GPS measurements.

The examples set forth herein further include a measurement comparison module, a GPS delay determination module, parameter consuming and control, modules including a vehicle state estimation module, and profile generation module for estimating GPS measurement delays, compensating for the delays to estimate states of a host vehicle, and then performing various operations based on the estimated states of the host vehicle, such as controlling actuators, performing diagnostics, performing safety operations, performing acceleration and deceleration operations, etc. Accurate and robust vehicle state estimates are made and include fusing estimates generated based on available sensors and GPS receiver. A real-time GPS delay is determined based on outputs of the sensors, which enables accurate synchronization of GPS measurements with other sensor-based estimates and allows for identification of GPS measurement outliers. The examples provide improved performance and reliability of vehicle state estimates in which GPS measurements are used.

Figure 1:
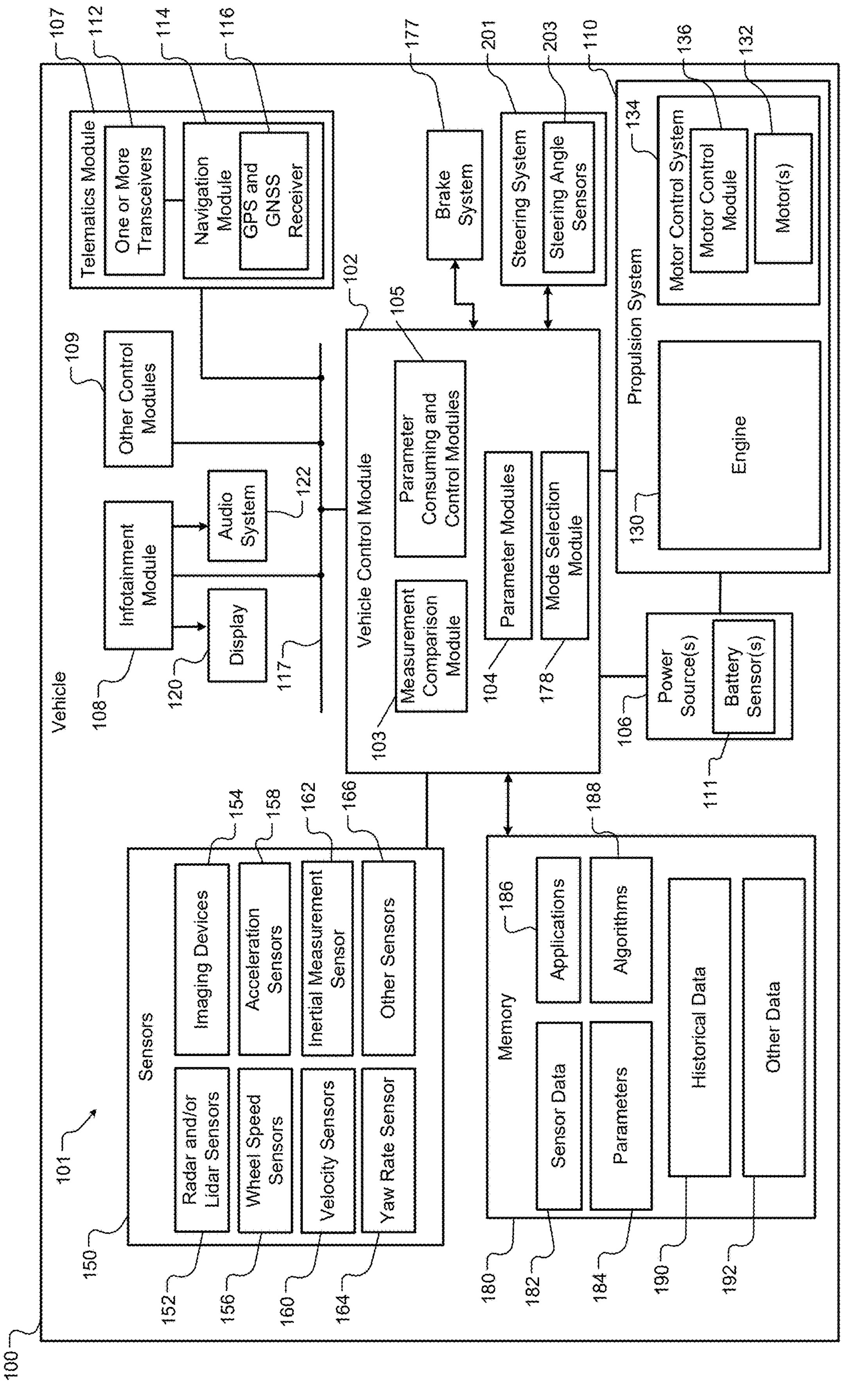
FIG. 1 is a functional block diagram of an example host vehicle including a control system having a measurement comparison module, parameter modules, and parameter consuming and control modules in accordance with the present disclosure.

FIG. 1 shows a host vehicle 100 including an example control system 101 including a vehicle control module 102, which may include a measurement comparison module 103, parameter modules 104, and parameter consuming and control modules 105. The measurement comparison module 103 as further described below determines delay associated with signals received from a GPS and GNS receiver 116. The measurement comparison module 103 may also determine an uncertainty value associated with the determined delay. The determined delays and optionally the corresponding uncertainty values are then used by the parameter consuming and control modules 105, which perform various operations based on the delays. The parameter modules 104 receive signals from sensors, such as any of the sensors referred to herein, and determine corresponding parameters. The parameter consuming and control modules 105 may include a vehicle state estimation module, an actuator control module, a diagnostic module, a safety module, and/or other module (e.g., a brake system control module, a steering system control module, a propulsion system control module, and/or a power source control module), which may operate based on signals from the modules 103, 104 and the sensors. Two or more of these modules may be implemented as a single module.

The vehicle state estimation module may determine one or more states of one or more parameters of the vehicle (e.g., states of vehicle speed and/or location) based on the signals received from the measurement comparison module 103. In an embodiment, the vehicle state estimation module also determines one or more uncertainty values associated respectively with the determined one or more states. The actuator module may control and adjust states of one or more actuators (e.g., motors, an engine, brake pressure, steering angle, etc.) based on the estimated states and optionally the corresponding uncertainty values.

The diagnostic module may determine, for example, if one or more sensors and/or modules are not operating or are operating inappropriately based on the signals received from the measurement comparison module 103. For example, when a vehicle speed estimate is generated based on an output of a vehicle sensor and more than a predetermined amount different than an estimate provided by a GPS and Global Navigation Satellite System (GNSS) receiver, then the vehicle sensor may be determined to be operating inappropriately. As another example, if a parameter signal generated by a GPS and GNSS receiver exceeds predetermined threshold, then the parameter signal may be determined to be out of range. These determinations may be based on the outputs of the parameter modules 104 and/or inputs (or sensor signals) received from the sensors. The safety module may perform various operations such as adjusting acceleration, deceleration, and/or steering angle of the vehicle to, for example, avoid a collision. These operations may be performed based on the stated delays and optionally the corresponding uncertainty signals.

The modules 102-105 may perform various operations based on interactions with a driver of the host vehicle 100. The vehicle control module 102 may perform autonomous operations based on the interaction including responses received from the driver. The vehicle control module may be implemented as one or more control modules and/or one or more controllers.

The vehicle 100 further includes one or more power sources 106, a telematics module 107, an infotainment module 108, other control modules 109 and a propulsion system 110. The vehicle control module 102 may control operation of the vehicle 100 and the modules 107, 108 and 109 and the propulsion system 110. The power sources 106 may include one or more battery packs, a generator, a converter, a control circuit, terminals for high and low voltage loads, etc., as well as one or more battery sensors 111 for detecting states of the power sources 106 including voltages, current levels, states of charge, etc.

The telematics module 107 provides wireless communication services within the vehicle 100 and wirelessly communicates with service providers, back offices, central offices, cloud-based networks, businesses, and devices external to the vehicle 100. The telematics module 107 may support Wi-Fi®, Bluetooth®, Bluetooth Low Energy (BLE), near-field communication (NFC), cellular, legacy (LG) transmission control protocol (TCP), long-term evolution (LTE), and/or other wireless communication and/or operate according to Wi-Fi®, Bluetooth®, BLE, NFC, cellular, and/or other wireless communication protocols. The telematics module 106 may include one or more transceivers 112 and a navigation module 114 with a global positioning system (GPS) and GNSS receiver 116. The transceivers 112 wirelessly communicate with network devices internal and external to the vehicle 100 including cloud-based network devices, central stations, back offices, and portable network devices. The transceivers 112 may perform pattern recognition, channel addressing, channel access control, and filtering operations.

The navigation module 114 executes a navigation application to provide navigation services. The navigation services may include location identification services to identify where the vehicle 100 is located. The navigation services may also include guiding a driver and/or directing the vehicle 100 to a selected location. The navigation module 114 may communicate with a central station to collect map information indicating levels of traffic, transportation object identification and locations (e.g., locations and types of signs), path information, locations of turns, lane identification, ramp locations, etc. As an example, if the vehicle 100 is an autonomous vehicle, the navigation module 114 may direct the vehicle control module 102 along a selected route to a selected destination. The GPS and GNSS receiver 116 may provide vehicle state measurement information such as velocity and/or direction (or heading) of the vehicle 100 and other vehicles and objects (e.g., pedestrians and cyclists) and/or global clock timing information. The GPS and GNSS receiver 116 may generate a GPS signal that is provided to the vehicle control module 102. The GPS signal and the corresponding vehicle state measurement information when received at the vehicle control module 102 may be delayed (i.e., have associated lag). The lag time of the GPS signal may vary and be dependent on bus traffic of bus 117, satellite configurations, network traffic, amount of acceleration of the vehicle 100, etc.

The infotainment module 108 may include and/or be connected to an audio system 122 and/or a video system including one or more displays (one display 120 is shown). The display 120 and audio system 122 may be part of a human machine interface. The displays may include cluster and/or center console displays, head-up displays, etc. Messages may be displayed, audibly played out, and/or indicated via the display 120, the audio system 122, and/or via one or more other output devices. The infotainment module 108 may provide various proactive messages and information. The infotainment module 108 may, for example, guide a vehicle operator to a certain location, around a turn, to change lanes, and/or display other information.

The propulsion system 110 may include one or more torque sources, such as one or more motors and/or one or more engines (e.g., internal combustion engines). In the example shown in FIG. 1, the vehicle 100 includes an engine 130 and one or more motors 132. The torque sources are independently controlled. The propulsion system 110 includes a motor control system 134 that includes the one or more motors 132 and a motor control module 136 that may control operation of the one or more motors 132 based on signals from the vehicle control module 102.

The modules 102-105 and 107-109 may communicate with each other via one or more buses 117, such as a controller area network (CAN) bus and/or other suitable interface. The vehicle control module 102 may control operation of vehicle modules, devices and systems based on feedback from sensors 150.

The sensors 150 may include exterior sensors, interior sensors, vehicle state sensors, and other sensors. For example, the sensors 150 may include, as shown, radar and/or lidar sensors 152, exterior imaging sensors (e.g., cameras) 154, wheel speed sensors 156, acceleration sensors (e.g., longitudinal and lateral acceleration sensors) 158, velocity sensors (e.g., longitudinal and lateral velocity sensors) 160, an inertial measurement sensor 162, a yaw rate sensor 164, and other sensors 166. The other sensors 168 may include wheel angle sensors and/or other vehicle state sensors and/or motion detection sensors.

The exterior sensors may be used to detect objects external to the vehicle 100 and/or in a path of the vehicle 100. The interior sensors may include interior imaging sensors (e.g., cameras) and a microphone or microphone array, which may be used to monitor physical activity, eye movement, and/or gaze direction of a driver and/or to interact with the driver. The interior sensors may also be used to detect gestures made by the driver, detect orientation of a body of the driver, detect speech of the driver, etc.

The mode selection module 178 may select a vehicle operating mode. As an example, the vehicle control module 102 may operate in a fully or partially autonomous mode and may control the propulsion system 110, a brake system 177, and a steering system 201. The steering system 201 includes a steering wheel angle sensor 203. In an embodiment, the vehicle control module 102 controls operation of the systems 101, 110, 177 and 201 based on interactions with a vehicle occupant (or driver). The vehicle control module 102 may i) perform autonomous operations such as steering, braking, accelerating, etc., and/or ii) display and/or audibly playout messages and/or output messages and/or corresponding signals via other output devices.

The vehicle 100 may further include the memory 180. The memory 180 may store sensor data 182, parameters 184, applications 186, algorithms 188, historical data 190, and other data 192. The algorithms 188 may include any of the algorithms implemented by the modules 102, 103, 104, 105 and/or algorithms of other modules referred to herein. The parameters may include, for example, sensor parameters and data from the sensors 150. The applications 186 may include applications executed by the modules 102-105, 108, 109.

Although the memory 180 and the vehicle control module 102 are shown as separate devices, the memory 180 and the vehicle control module 102 may be implemented as a single device. The memory 180 may also store historical data 190 and other data 192 such as driver driving patterns, data collected by and/or generated by the modules 102-105 and 107, traffic data, navigation data, map data, GPS data, path data, sensor data, etc.

The vehicle control module 102 may control operation of the propulsion system 110, the video system including the display 120, the audio system 122, the brake system 177, the steering system 201, and/or other devices and systems according to parameters set by the modules 102-105, 108, 201. The vehicle control module 102 may set at least some of the parameters based on signals received from the sensors 150.

The vehicle control module 102 may receive power from the power sources 106, which may be provided to the propulsion system 110, the brake system 177, the steering system 201, etc. Power supplied to the motors 132, the brake system 177, the steering system 201, and/or actuators thereof may be controlled by the vehicle control module 102 to, for example, adjust: motor speed, torque, and/or acceleration; braking pressure; steering wheel angle; pedal position; etc. This control may be based on the outputs of the sensors 150, the navigation module 114, the GPS and GNSS receiver 116 and the data and information stored in the memory 180.

The modules 102 and/or 103 may determine various parameters including vehicle speeds and accelerations, yaw rate, inertial momentum, wheel angles, steering wheel angle, a gear state, an accelerator position, a brake pedal position, and/or other information. The modules 102, 103 may further determine lane boundaries, lane locations, road locations, turn locations, speed limits, object locations, environmental conditions, etc.

Figure 2:
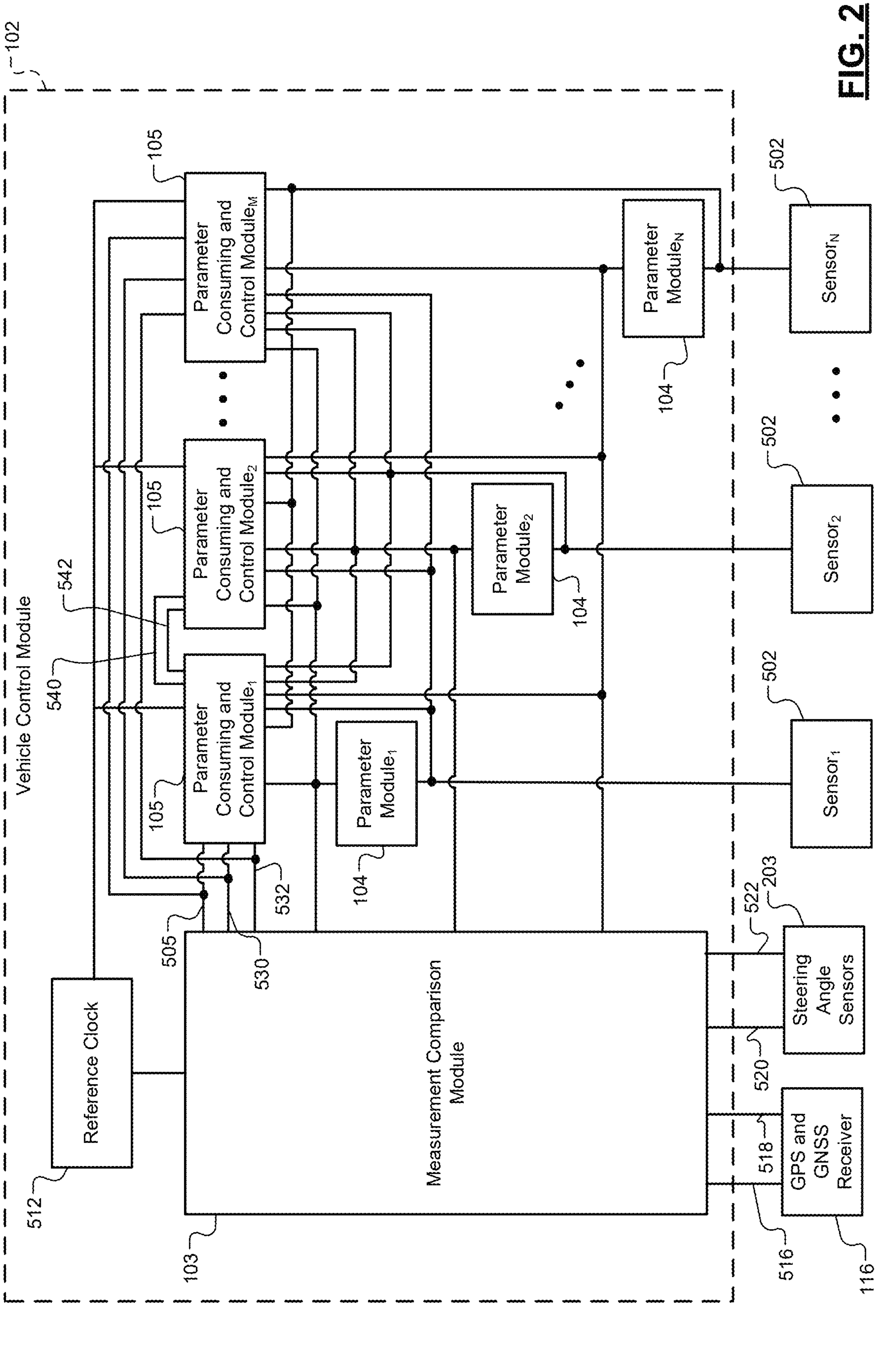
FIG. 2 is a functional block diagram of an example vehicle control module implementing a measurement comparison module in accordance with the present disclosure.

FIG. 2 shows a vehicle control module (e.g., the vehicle control module 102 of FIG. 1) that includes the measurement comparison module 103, parameter modules 104, the parameter consuming and control modules 105, and a reference clock 512. The vehicle control module 102 receives signals from the GPS and GNSS receiver 116, steering angle sensors 203, and other sensors 502, such as any of the sensors 150 of FIG. 1. The GPS and GNSS receiver 116 generates the GPS measurement signal 516 and an uncertainty signal 518. The steering angle sensors generate steering angle signals 520 and may generate uncertainty signals 522. The uncertainty signals 518 and 522 indicate uncertainty in the signals 516 and 520. The sensors 502 generate output signals that are provided to the parameter modules 104 and may be provided to and may be used by the parameter consuming and control modules 105. One or more of the parameter consuming and control modules 105 may not use the outputs of one or more of the sensors 502.

The measurement comparison module 103 determines delay 505 ($\hat{t}_{delay}$) in the GPS measurement signal 516 (e.g., $\hat{v}_{xgps}$) received from the GPS and GNSS receiver 116 as compared to other measurement signals generated by the sensors 502, which do not have the lag associated with the GPS measurement signal 516. As an example, the GPS measurement signal 516 may indicate a velocity estimate of the corresponding host vehicle and have associated lag relative to outputs of the parameter modules 104. The measurement comparison module 103 determines the delay $\hat{t}_{delay}$ based on the outputs of the parameter modules 104 and a reference clock signal from the reference clock 512. The delay $\hat{t}_{delay}$ is sent to the parameter consuming and control modules 105. The measurement comparison module 103 may also determine an uncertainty level 530 in the delay $\hat{t}_{delay}$ and provide the uncertainty level 530 to the parameter consuming and control modules 105. In an embodiment, the measurement comparison module 103 outputs the GPS measurement signal 516 along with a timestamp (designated 532) to the parameter consuming and control modules 105.

The parameter modules 104 determine parameters based on the output signals respectively from the sensors 502. In an embodiment, one or more of the parameter modules 104 generate measurement signals that are then compared to the GPS measurement signal 516 generated by the GPS and GNSS receiver 116. In an embodiment, the comparisons occur at the measurement comparison module 103. In an embodiment, the parameter modules 104 may include an IMU compensation module, accelerometer modules, and wheel speed modules. The IMU compensation module estimates a speed of the vehicle based on an output of the inertial measurement sensor 162 of FIG. 1. The accelerometer modules determine vehicle speed based on outputs of accelerometers. The wheel speed modules estimate the speed of the vehicle based on respectively detected wheel speeds. Vehicle speed estimates may be provided directly from sensors, such as from radar sensors and/or cameras. The same can be done for vehicle location and/or other parameters provided by the GPS and GNSS receiver 116.

The measurement comparison module 103 and/or the parameter consuming and control modules 105 may compare the speed estimates from the parameter modules 104 to the GPS measurement signal 516 to estimate the speed of the vehicle. In an embodiment, one or more of the modules 103,105 time shifts the GPS measurement (or speed) signal 516 based on the determined delay 505 of the GPS measurement signal 516 to be time synchronized with the outputs of the sensors 502. In an embodiment, the parameter consuming and control modules 105 may add or subtract the delay 505 from the timestamped GPS measurement signal 532 based on the reference clock signal when estimating the state (e.g., vehicle speed) 540 of the vehicle. In an embodiment, one of the parameter consuming and control modules 105 (e.g., vehicle state estimation module) may output the determined state 540 and a corresponding uncertainty signal 542 to the actuator control module and/or other ones of the parameter consuming and control modules 105. Examples of the signals 540, 542 are shown.

One or more of the parameter consuming and control modules 105 may control operations of one or more actuators based on the signals received from the modules 103, 104, the sensors 502, and the reference clock 512. The diagnostic module may determine that one or more of the sensors 502 is not operating appropriately and prevent usage of or discard outputs from the one or more sensors 502. The safety module may adjust speed, acceleration, deceleration and/or steering of the vehicle when for example, one or more of the determined parameters exceeds corresponding predetermined thresholds.

Figure 3:
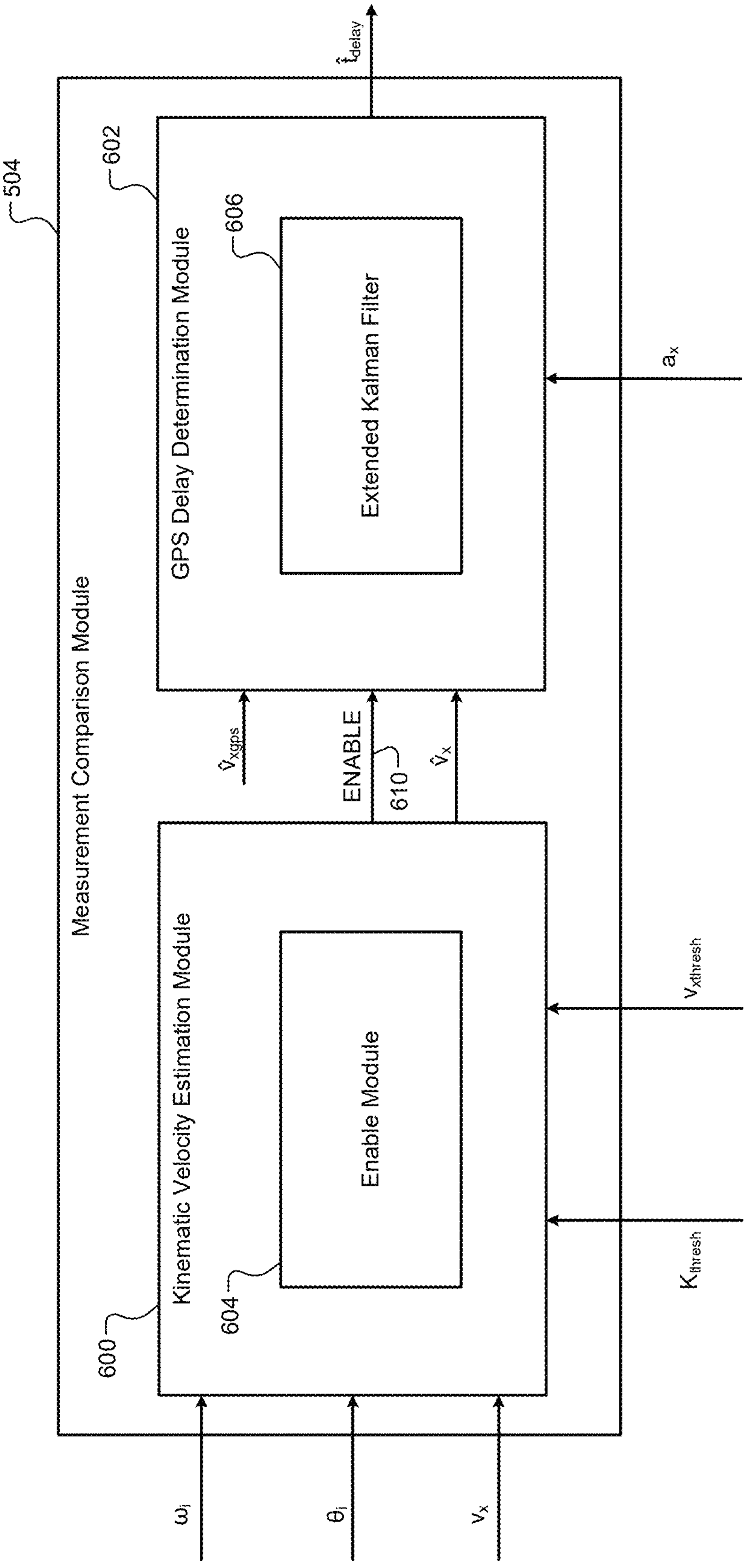
FIG. 3 is a functional block diagram of the measurement comparison module in accordance with the present disclosure.

FIG. 3 shows an example of the measurement comparison module 103, which in this example includes a kinematic velocity estimation module 600 and a GPS delay determination module 602. The kinematic velocity estimation module 600 includes an enable module 604. The GPS delay determination module 602 includes an extended Kalman filter (EKF) 606. In an embodiment, one or more other filters are used instead of or in addition to the EKF 606, such a Kalman filter, an Unscented Kalman filter (UKF), and/or a particle filter. In an embodiment, other calculation methods are used alternatively or in addition to the stated filters, such as machine learning algorithms. The kinematic velocity estimation module 600 receives input signals $\omega_i$, $\theta_i$, $v_x$, and thresholds $\kappa_{thresh}$, $v_{x_{thresh}}$, where $\omega_i$ refers to wheel velocities of the vehicle in radians per second, $\theta_i$ refers to road wheel angles in radians, $v_x$ refers to an estimate of longitudinal velocity in meters per second (m/s), $\kappa_{thresh}$ refers to a wheel slip ratio threshold, and $v_{x_{thresh}}$ refers to a minimum longitudinal speed threshold in meters per second. The kinematic velocity estimation module 600 generates an estimated vehicle velocity $\hat{v}_x$, which refers to a kinematic velocity estimate of the vehicle (or longitudinal velocity estimate of a center of gravity of the vehicle) in meters per second based on the input signals $\omega_i$, a left side average velocity $\hat{v}_L$ and a tire radius $r_R$. The enable module 604 generates an enable signal ENABLE 610 based on the input signals $\omega_i$, $\theta_i$, $v_x$ and the thresholds $\kappa_{thresh}$, $v_{x_{thresh}}$. The enable signal ENABLE 610 enables GPS delay estimation (or learning of GPS delay) as determined by the GPS delay determination module 602.

The GPS delay determination module 602 estimates the delay $\hat{t}_{delay}$ based on i) a GPS estimated velocity $\hat{v}_{xgps}$ of the vehicle, ii) the enable signal ENABLE 610, the estimated velocity $\hat{v}_x$, and acceleration $a_x$ of the vehicle, where $\hat{v}_{xgps}$ refers to a longitudinal velocity as indicated by GPS receiver in meters per second, $a_x$ refers to a longitudinal acceleration at center of gravity of vehicle in meters per second squared (m/s$^2$), $a_{x_{thresh}}$ refers to a longitudinal acceleration threshold in meters per second squared, and $\hat{t}_{delay}$ refers to an estimated delay in a GPS measurement (e.g., a delay in a GPS estimate of vehicle velocity). In an embodiment, the GPS delay determination module 602 may reject the estimated velocity if determined not to be accurate. This may occur for example when wheel slip has exceeded a threshold on both wheels on a single side of the vehicle. The estimated velocity may not be rejected if at least one wheel on a single side of the vehicle has not exceeded the threshold.

GPS Delay EKF Formulation

The GPS delay determination module 602 may determine the GPS delay $\hat{t}_{delay}$ using the following equations 1-7 and below provided definitions of equations 8-13. The GPS delay may be determined by the EKF 606.

$$\hat{x}_{k|k-1} = f(\hat{x}_{k-1|k-1}) \tag{1}$$

$$P_{k|k-1} = F_k P_{k-1|k-1} F_k^T + Q_k \tag{2}$$

$$\tilde{y}_k = z_k - h(\hat{x}_{k|k-1}) \tag{3}$$

$$S_k = H_k P_{k|k-1} H_k^T + R_k \tag{4}$$

$$K_k = P_{k|k-1} H_k^T S_k^{-1} \tag{5}$$

$$\hat{x}_{k|k} = \hat{x}_{k|k-1} + K_k \tilde{y}_k \tag{6}$$

$$P_{k|k} = (I - K_k H_k) P_{k|k-1} \tag{7}$$

Definitions for GPS Delay Determination $$x = \hat{t}_{delay} \tag{8}$$

$$f(\hat{x}_{k-1|k-1}) = \hat{x}_{k-1|k-1} \tag{9}$$

-continued $$z_k = \hat{v}_{gps} - \hat{v}_x \tag{10}$$

$$h(\hat{x}_{k|k-1}) = -a_x x \tag{11}$$

$$F_k = 1 \tag{12}$$

$$H_k = -a_x \tag{13}$$

In the above equations 1-13, $Q_k$ refers to process covariance, $R_k$ refers to observation noise covariance, $\hat{x}_{k|k-1}$ refers to an estimate of GPS delay based on previous estimate of function $f$, $P_{k|k-1}$ refers to an estimate of GPS delay estimate covariance based on function $f$ previous time delay estimate (or predicted time delay uncertainty), $\tilde{y}$ refers to how much the observation differs from the model predicts the observation value should be, $S_k$ refers to covariance (or predicted uncertainty of measurement error), $K_k$ refers to Kalman gain of Kalman filter (or how much weight to put on current measurement versus the $\hat{x}_{k|k-1}$ estimate), $\hat{x}_{k|k}$ refers to an updated state estimate of GPS delay, $P_{k|k}$ refers to an updated GPS delay estimate uncertainty, $f(\hat{x}_{k-1|k-1})$ refers to a function for predicting GPS delay based on a previous estimate of GPS delay (this is referred to as the state transition function), $z_k$ refers to a current observation (or current measurement reading), $h(\hat{x}_{k|k-1})$ refers to a function for mapping current state estimate to what the corresponding observation would be (this is referred to as the observation function), $F_k$ refers to a Jacobian, $$\frac{\partial f}{\partial x},$$

of a state transition function (or a linearized derivative of the state transition function), $H_k$ refers to a Jacobian, $$\frac{\partial h}{\partial x},$$

of an observation function (or a linearized derivative of the observation function), I refers to an identity matrix, $t_{delay}$ refers to an estimated delay of the GPS measurement (e.g., delay in GPS velocity signal), $\hat{v}_{gps}$ refers to GPS longitudinal velocity, $\hat{v}_k$ refers to a estimated velocity from 600, and $a_x$ refers to a measured longitudinal acceleration.

For equation 8, it may be assumed that the GPS delay $\hat{t}_{delay}$ is constant for short time intervals. Equation 10 is used to determine a difference between the GPS velocity and the wheel speed-based velocity estimate. This is an example of estimating the delay using the EKF 606. However, other filters may be used to determine the delay. In addition, the delay may be determined and corresponding calculations may be made using machine learning methods.

Figure 4A:
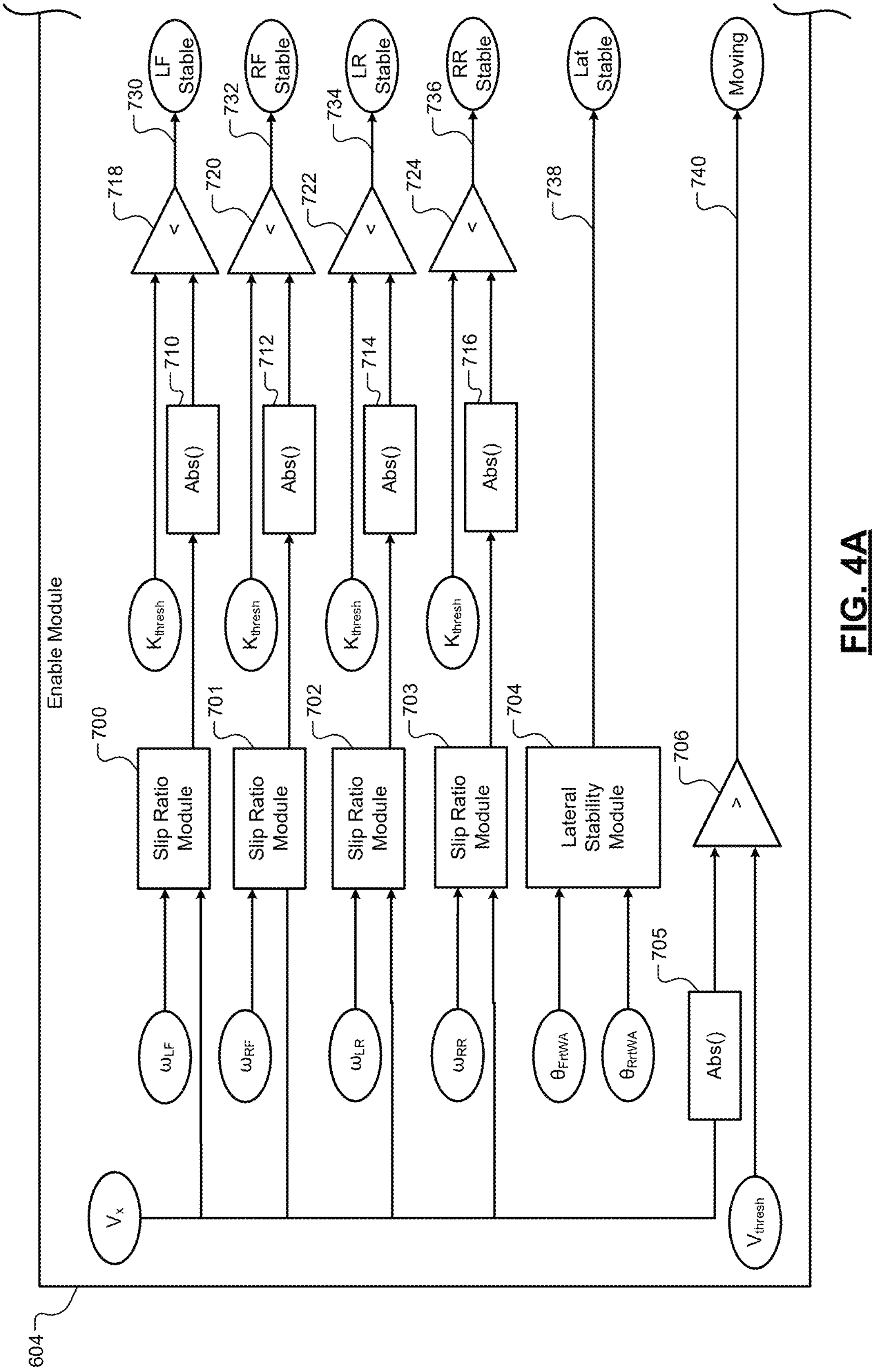
FIGS. 4A and 4B (collectively FIG. 4) are collectively a functional block diagram of an enable module in accordance with the present disclosure.
Figure 4B:
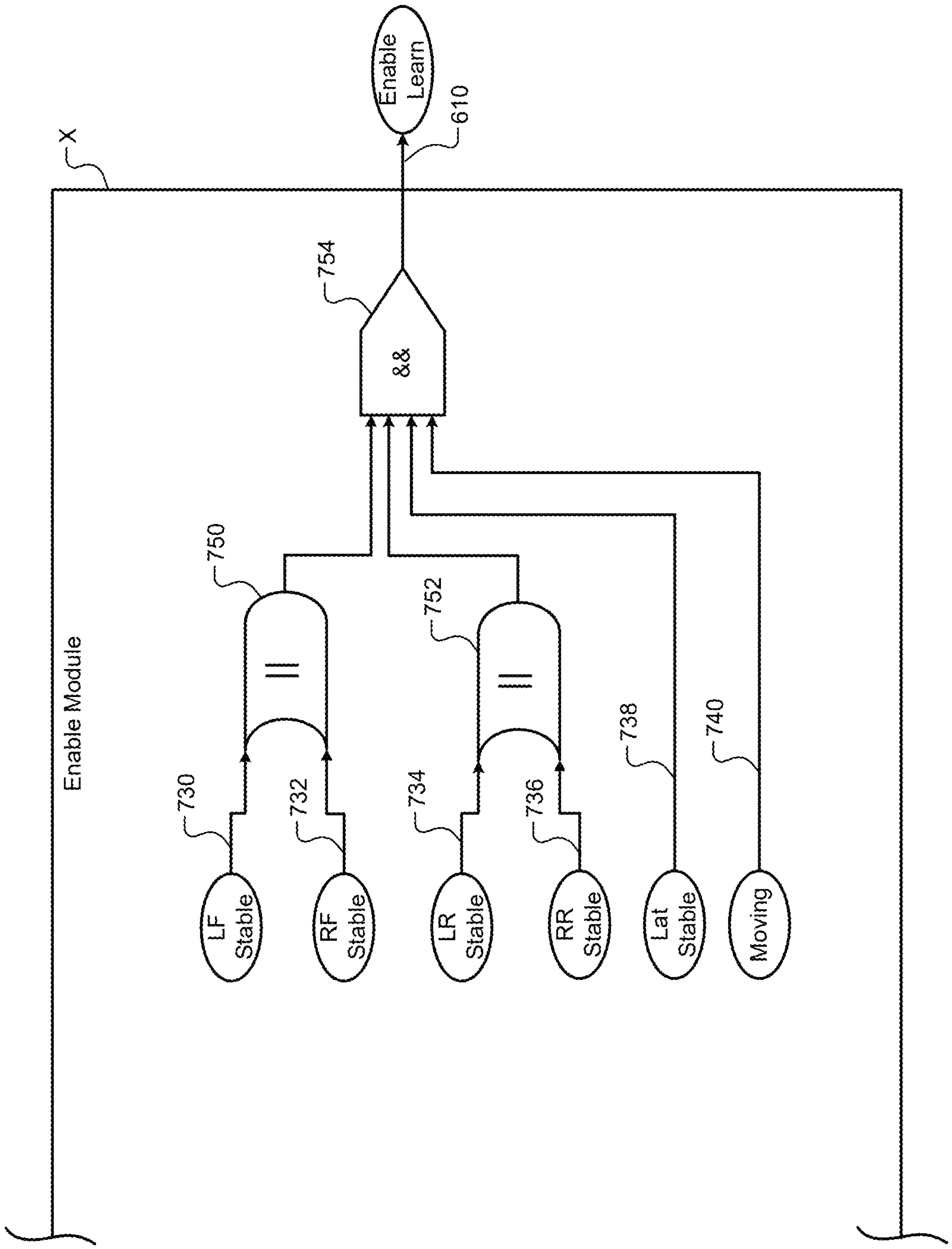

FIG. 4 shows an example of the enable module 604. The enable module 604 may include slip ratio modules 700, 701, 702, 703, a lateral stability module 704, an absolute module 705, a comparator 706, absolute modules 710, 712, 714, 716 and comparators 718, 720, 722, 724. The slip ratio modules 700-703 calculate slip ratios based on the wheel speeds $\omega_{LF}$, $\omega_{RF}$, $\omega_{LR}$, $\omega_{RR}$ and based on the velocity $v_x$. The slip ratios may be calculated using equation 14, where $\kappa_i$ is slip ratio, $\omega_i$ is wheel speed in radians, $r_i$ is effective wheel radius in meters, $v_x$ is an estimated velocity, and $v_{x_{thresh}}$ is a minimum velocity threshold.

$$\kappa_i = \frac{(\omega_i r_i - v_x)}{\max(|v_x|, v_{thresh})} \quad (14)$$

The absolute modules 710, 712, 714, 716 determine the absolute values of the slip ratios. The comparators 718, 720, 722, 724 determine whether the absolute values are less than the slip threshold $K_{thresh}$. If yes, then outputs indicate that the wheels are stable. If not, then the wheels are not stable. The comparators 718, 720, 722, 724 output signals 730, 732, 734, 736 indicative of whether the wheels are respectively stable. These operations are performed to determine whether each wheel has low enough slip that would allow for use with the estimated velocity calculation.

The lateral stability module 704 determines whether the vehicle is laterally stable based on the steering angles $\theta_{FrtRWA}$, $\theta_{RrRWA}$, which are the front and rear road wheel angles. This may include looking up the lateral steering angles in a look up table to determine whether the lateral steering angles are associated with lateral stability. The lateral stability module 704 outputs a signal 738 indicative of whether the vehicle is laterally stable. Velocity and road wheel angles are utilized to help determine body slip angle. If the body slip angle is large enough, it can cause a calculated wheel-based vehicle velocity to be erroneously higher than the actual vehicle velocity, and thus prevent determination of an accurate GPS lag estimate. Thus, when the body slip angle is too high, GPS lag determination is not enabled. The body slip angle may refer to a difference between a direction a vehicle is heading and a direction the body of the vehicle is pointing (or true heading).

The absolute module 705 determines an absolute value of the velocity $v_x$, which may be estimated based on the wheel speeds $\omega_{LF}$, $\omega_{RF}$, $\omega_{LR}$, $\omega_{RR}$. The comparator 706 determines whether the absolute value of the velocity $v_x$ is greater than the threshold the velocity threshold $v_{thresh}$. If greater than $v_{thresh}$, than the vehicle is moving at a speed greater than a predetermined speed. The predetermined speed is greater than or equal to 0. A signal 740 is generated to indicate whether the vehicle is moving and/or is moving at a speed greater than the predetermined speed. The GPS delay is not calculated unless the vehicle is moving. This helps to avoid a divide by zero for slip ratio calculation.

The enable module 604 may further include comparators 750, 752 and an AND gate 754. The signals 730, 732 are received at the comparator 750, which determines if the signals 730, 732 are equal. If yes, the output of the comparator 750 is HIGH (or 1), otherwise, the output is LOW (or 0). The signals 734, 736 are provided to the comparator 752, which determines if the signals 734, 736 are equal. If yes, the output of the comparator 752 is HIGH (or 1), otherwise, the output is LOW (or 0). The outputs of the comparators 750, 752 and the signals 738, 740 are provided to the AND gate 754. The output of the AND gate 754 is provided as the enable signal ENABLE 610, also referred to as an enable learn signal. The comparators 750, 752 account for differences in wheel velocities of wheels when the vehicle is turning. A "stable" wheel is needed on each side of the vehicle to enable learning of GPS velocity measurement delays.

Figure 5:
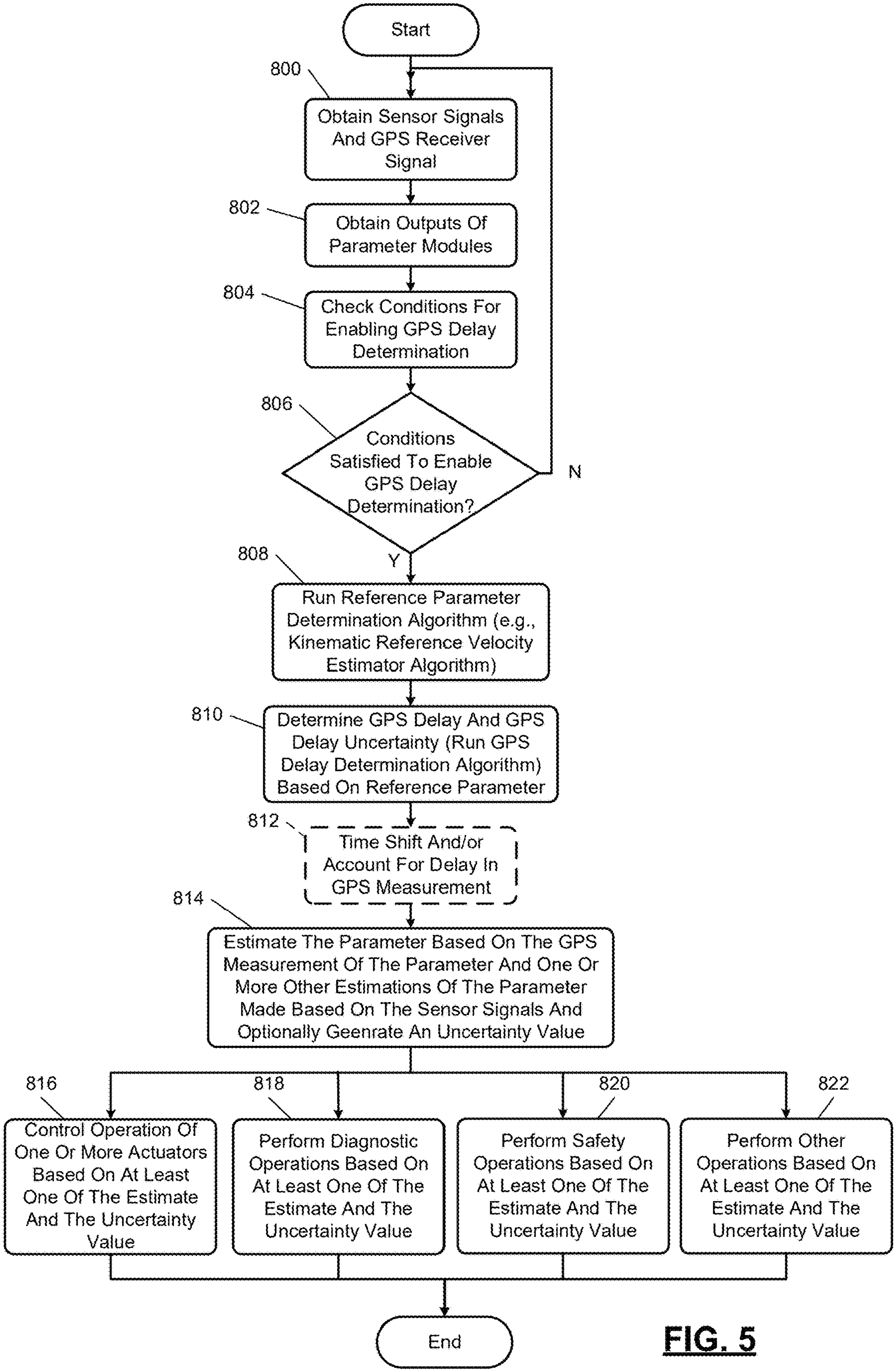
FIG. 5 illustrates a parameter delay based control method in accordance with the present disclosure.

FIG. 5 shows parameter delay based control method. The following operations may be iteratively performed.

At 800, sensor signals and GPS receiver signal are received at the vehicle control module 102 as shown in FIG. 1. At 802, outputs of the parameter modules 104 are generated. At 804, conditions are checked for enabling GPS delay determination as shown in FIG. 4.

At 806, if the conditions are satisfied, operation 808 is performed, otherwise operation 800 is performed. At 808, a reference parameter determination algorithm is executed to generate a reference parameter (e.g., estimated velocity). An example of this algorithm is described with respect to FIG. 6.

At 810, GPS delay and GPS delay uncertainty are determined as described above. A GPS delay determination algorithm may be performed based on the reference parameter to determine the GPS delay and GPS uncertainty.

At 812, the delay of the GPS measurement signal is accounted for which may include time shifting the GPS measurement signal. This operation may be performed at 810. The amount of time shifting may not be uniform and may change over time.

At 814, the parameter is estimated based on the GPS measurement of the parameter and one or more other estimations of the parameter made based on the sensor signals. At 816, 818, 820, 822, operations are performed based on the estimation of the parameter as determined at 814. These operations are provided as examples, may be performed by the parameter consuming and control modules 105 of FIGS. 1-2, and other operations may be performed.

At 816, one or more of the parameter consuming and control modules 105 controls operations of one or more actuators based on at least one of the estimate and optionally the corresponding uncertainty value, as described above. At 818, one or more of the parameter consuming and control modules 105 performs diagnostic operations based on at least one of the estimate and optionally the corresponding uncertainty value, as described above. At 820, one or more of the parameter consuming and control modules 105 performs safety operations based on at least one of the estimate and optionally the corresponding uncertainty value, as described above. At 822, one or more of the parameter consuming and control modules 105 performs other operations based on at least one of the estimate and optionally the corresponding uncertainty value.

Figure 6:
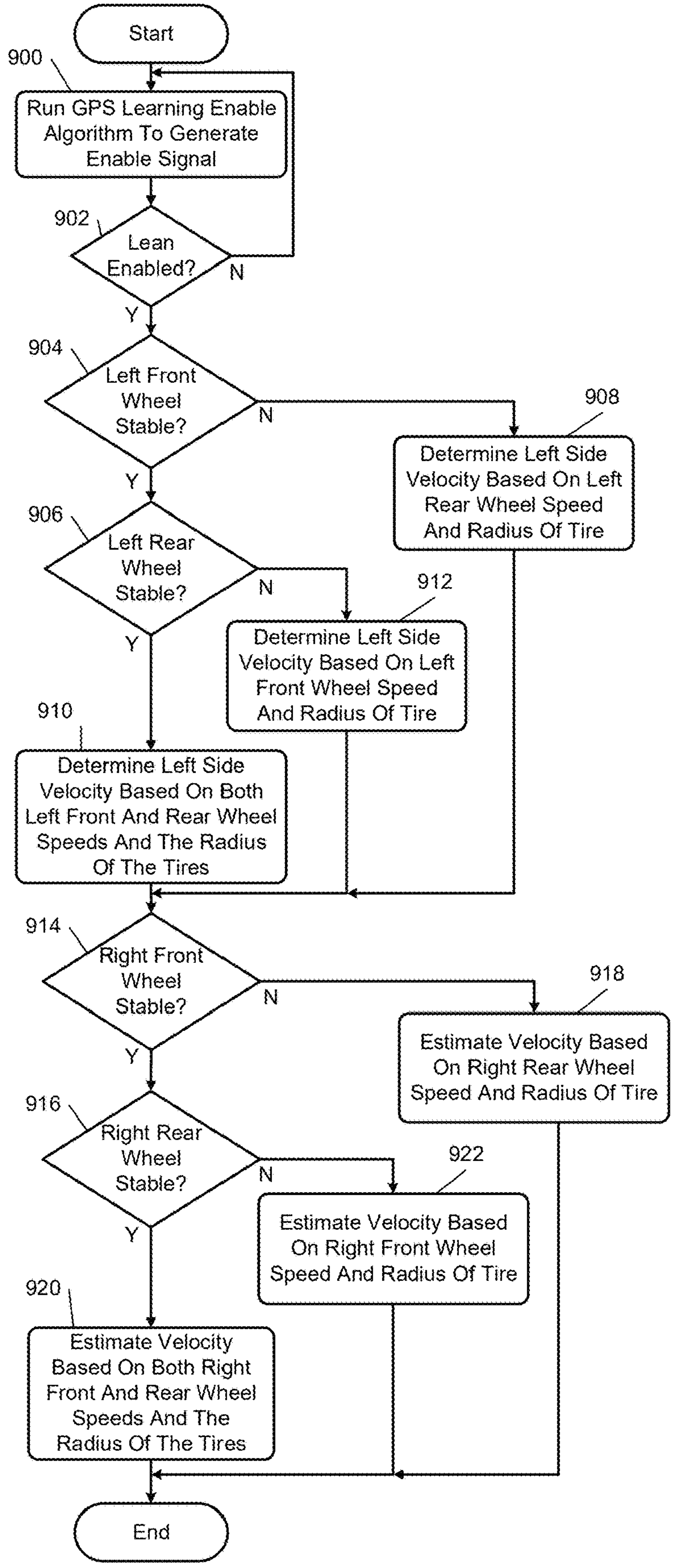
FIG. 6 illustrates a method of estimating a kinematic longitudinal velocity of a vehicle in accordance with the present disclosure.

FIG. 6 shows a method of estimating a kinematic longitudinal velocity of a vehicle. The following operations may be iteratively performed. The estimated velocity is determined when conditions for learning the GPS delay are satisfied. The estimated velocity is determined based on which wheels are stable. In an embodiment, a left side velocity is determined, a right side velocity is determined, and the left and right side velocities are averaged to determine the estimated velocity.

At 900, the GPS learning enable algorithm for enabling execution of GPS lag determination as performed by the kinematic velocity estimation module 600 of FIG. 3 is performed to generate the enable signal ENABLE 610. At 902, it is determined whether GPS lag determination is enabled. If yes, operation 904 may be performed, otherwise operation 900 may be performed.

At 904, it is determined whether the left front wheel is stable. If yes, operation 906 is performed, otherwise operation 908 is performed.

At 906, it is determined whether the left rear wheel is stable. If yes, operation 910 is performed, otherwise operation 912 is performed.

At 908, a left side velocity is determined based on left rear wheel speed and a radius of the tire of the left rear wheel. This may be done using equation 15.

$$\hat{v}_L = \omega_{LR} r_R \tag{15}$$

At 910, a left side average of an estimated velocity is determined based on both left front and rear wheel speeds and the radius of the tires. This may be done using equation 16.

$$\hat{v}_L = \frac{(\omega_{LF} r_F + \omega_{LR} r_R)}{2} \tag{16}$$

At 912, a left side velocity is determined based on left front wheel speed and the radius of the tire of the left front wheel. This may be done using equation 17.

$$\hat{v}_L = \omega_{LF} r_F \tag{17}$$

At 914, it is determined whether the right front wheel is stable. If yes, operation 916 is performed, otherwise operation 918 is performed. At 916, it is determined whether the right rear wheel is stable. If yes, operation 920 is performed, otherwise operation 922 is performed.

At 918, an estimated velocity is determined based on right rear wheel speed and radius of the tire of the right rear wheel. This may be done using equation 18.

$$\hat{v}_x = \frac{(\omega_{LR} r_R + \hat{v}_L)}{2} \tag{18}$$

At 920, the estimated velocity is determined based on both right front and rear wheel speeds and the radius of the tires. This may be done using equation 19.

$$\hat{v}_x = \frac{\frac{\omega_{LF} r_F + \omega_{RR} r_R}{2} + \hat{v}_L}{2} \tag{19}$$

At 922, the estimated velocity is determined based on right front wheel speed and the radius of the tire of the left front wheel. This may be done using equation 20.

$$\hat{v}_x = \frac{(\omega_{RF} r_F + \hat{v}_L)}{2} \tag{20}$$

Figure 7:
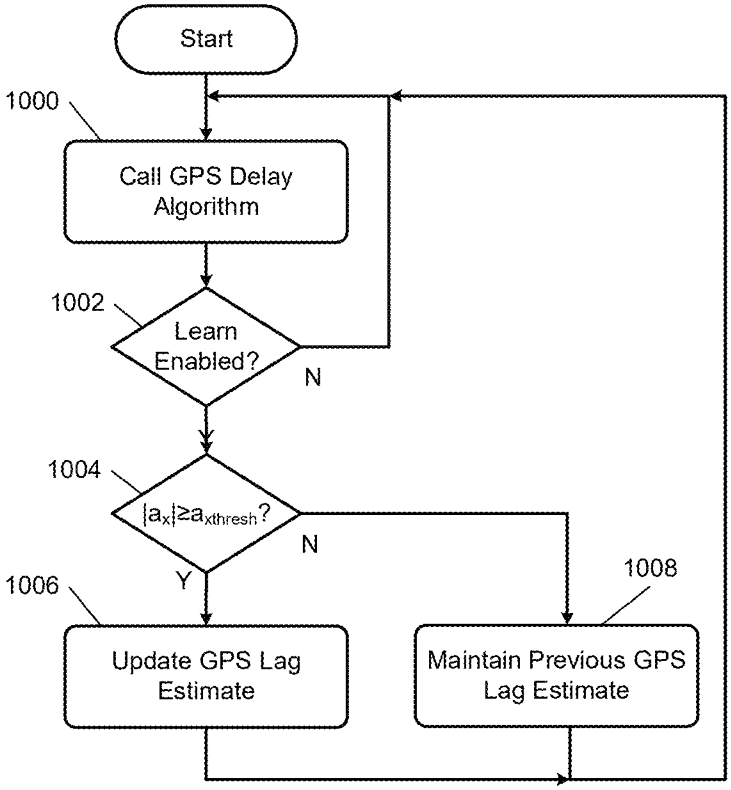
FIG. 7 illustrates a method for updating a global positioning system (GPS) lag estimate in accordance with the present disclosure.

FIG. 7 shows a method for updating a GPS lag (or delay) estimate. The following operations may be iteratively performed.

At 1000, a call to perform the GPS delay algorithm. The GPS delay algorithm may be executed by the EKF 606 of FIG. 3, which may receive the call. The call may be generated by a module of the vehicle control module 102 of FIG. 1 or by another module.

At 1002, it is determined whether learning of the GPS delay is enabled. If yes, operation 1004 is performed, otherwise operation 1000 may be performed.

At 1004, it is determined whether an absolute value of vehicle acceleration is greater than the acceleration threshold $a_{xthresh}$. If yes, operation 1006 is performed, otherwise operation 1008 is performed. In an embodiment, the GPS lag is updated if the vehicle is accelerating or decelerating and is not updated if the vehicle is not accelerating or decelerating.

At 1006, the GPS lag determination is updated (i.e., determined again), as described above. At 1008, the previously determined GPS lag is maintained and used to estimate a state of the vehicle, as opposed to updating the GPS lag.

The above-described operations of FIGS. 5-7 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples include using wheel speeds and accelerations to learn reported GPS speed time delays. Vehicle accelerometer information and steering angle measurements are used to determine when to enable learning of GPS measurement delays. Wheel stability is monitored to select wheel measurements for learning the GPS measurement delays. The learned time delay is used to align GPS measurements with outputs of vehicle sensors and/or estimates made based on the vehicle sensor outputs.

In an embodiment, optical measurements and/or radar measurements are used with wheels speeds to determine the GPS measurement delays. The learned GPS measurement delays are used to eliminate fusing of GPS speed measurement outliers and inaccuracies. Stochastic characteristics of the learned GPS measurement delays are used to determine the health of the GPS measurements. The learned GPS measurement delays are also used to update GPS measurement uncertainties to consuming control, estimation, diagnostics, safety, etc. algorithms. This may be done with or without realigning measurements.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A control system for a vehicle, the control system comprising:

at least one parameter module configured to receive at least one sensor signal from at least one sensor and generate at least one parameter signal;

a measurement comparison module configured to receive a measurement signal from a global position system receiver and the at least one parameter signal, and based on the measurement signal and the at least one parameter signal, determine delay in the measurement signal and generate a delay signal indicative of the delay, wherein the measurement comparison module comprises a kinematic velocity estimation module configured to generate an enable signal and a velocity signal based on a plurality of parameters, the velocity signal being indicative of an estimated velocity of the vehicle; and a global positioning system delay determination module is configured to determine the delay based on the enable signal and the estimated velocity; and at least one parameter consuming and control module configured to controlling at least one operation of the vehicle based on the delay.

2. The control system of claim 1, wherein the at least one parameter consuming and control module comprises:

a vehicle state estimation module configured to estimate a parameter of the vehicle based on the measurement signal, the at least one parameter signal, and the delay signal; and an actuator control module configured to control at least one actuator based on the estimated parameter.

3. The control system of claim 1, wherein the at least one parameter consuming and control module performs at least one of a diagnostic operation and a safety operation based on the delay.

4. The control system of claim 2, wherein:

the measurement comparison module is configured to receive a first uncertainty signal indicative of an uncertainty level of the measurement signal, and to generate a second uncertainty signal indicative of an uncertainty level of the delay indicated by the delay signal; and the at least one parameter consuming and control module is configured to estimate the parameter based on the second uncertainty signal.

5. The control system of claim 4, wherein the at least one parameter consuming and control module is configured to generate a third uncertainty signal based on the second uncertainty signal, and to estimate the parameter based on the third uncertainty signal.

6. The control system of claim 1, wherein the measurement comparison module is configured to compare the measurement signal to the at least one parameter signal to generate the delay signal based on a timing difference between the measurement signal and the at least one parameter signal.

7. The control system of claim 1, wherein the delay of the measurement signal relative to the at least one parameter signal varies over time.

8. The control system of claim 2, wherein:

the measurement comparison module is configured to time shift the measurement signal based on the delay; and the at least one parameter consuming and control module is configured to is configured to estimate the parameter based on the time shifted measurement signal.

9. The control system of claim 2, wherein the at least one parameter consuming and control module is configured to receive the measurement signal with a timestamp, and estimate the parameter based on the timestamp and the delay.

10. The control system of claim 2, wherein the at least one parameter consuming and control module is configured to receive the measurement signal with a timestamp, time shift the measurement signal, and estimate the parameter based on the time shifted measurement signal.

11. The control system of claim 1, wherein:

the at least one parameter signal comprises a wheel speed signal and a steering angle signal; and the kinematic velocity estimation module is configured to generate the velocity signal based on the wheel speed signal and the steering angle signal.

12. The control system of claim 11, wherein the kinematic velocity estimation module is configured to generate the enable signal based on at least one of the wheel speed signal and the steering angle signal.

13. The control system of claim 1, wherein:

the plurality of parameters include wheel velocities, road wheel angles, longitudinal velocity of the vehicle, a wheel slip ratio threshold, and a minimum longitudinal speed threshold; and the global positioning system delay determination module is configured to further determine the delay based on a global positioning system estimated velocity of the vehicle and a longitudinal acceleration of the vehicle.

14. The control system of claim 13, wherein the kinematic velocity estimation module comprises:

a plurality of slip ratio modules configured to calculate a plurality of slip ratios based on the wheel velocities and longitudinal velocity;

a plurality of absolute modules configured to generate absolute signals based on the plurality of slip ratios;

a first plurality of comparators configured to compare the absolute signals to thresholds and generate output signals indicative of whether wheels are stable;

a second plurality of comparators configured to compare the output signals; and an AND gate configured to receive outputs of the second plurality of comparators to generate the enable signal.

15. The control system of claim 14, further comprising a lateral stability module configured to generate a lateral stability signal based on the road wheel angles, wherein the AND gate is configured to receive the lateral stability signal and generate the enable signal based on the lateral stability signal.

16. The control system of claim 14, further comprising a comparator configured to compare an absolute value of the longitudinal velocity to a threshold and generate a moving output signal indicative of whether the vehicle is moving, wherein the AND gate is configured to receive the moving output signal and generate the enable signal based on the moving output signal.

17. A method for controlling operation of a vehicle, method comprising:

receiving at least one sensor signal from at least one sensor and generating at least one parameter signal;

receiving a measurement signal from a global position system receiver and the at least one parameter signal, and based on the measurement signal and the at least one parameter signal, determining delay in the measurement signal and generating a delay signal indicative of the delay;

generating an enable signal and a velocity signal based on a plurality of parameters, the velocity signal being indicative of an estimated velocity of the vehicle;

determining the delay based on the enable signal and the estimated velocity; and controlling at least one operation of the vehicle based on the delay.

18. The method of claim 17, further comprising:

receiving a first uncertainty signal indicative of an uncertainty level of the measurement signal, and to generate a second uncertainty signal indicative of an uncertainty level of the delay indicated by the delay signal;

generating a third uncertainty signal based on the second uncertainty signal, and estimating the parameter based on the second uncertainty signal and the third uncertainty signal.

19. The method of claim 17, further comprising:

receiving the measurement signal with a timestamp;

time shifting the measurement signal based on the delay and the timestamp; and estimating the parameter based on the time shifted measurement signal.

* * * * *